United States Patent [19]
Engler

[11] Patent Number: 6,076,417
[45] Date of Patent: Jun. 20, 2000

[54] RACK GUIDE HAVING LINEAR INNER WALLS FOR SUPPORTING A RACK

[75] Inventor: Leonard W. Engler, Rochester Hills, Mich.

[73] Assignee: TRW Inc., Lyndhurst, Ohio

[21] Appl. No.: 09/123,575

[22] Filed: Jul. 27, 1998

Related U.S. Application Data

[63] Continuation-in-part of application No. 08/804,989, Feb. 25, 1997, abandoned.

[51] Int. Cl.[7] .................................................. F16H 35/00
[52] U.S. Cl. ..................... 74/388 PS; 74/422; 180/427; 280/267
[58] Field of Search ............................... 74/388 PS, 422, 74/498, 89.11; 180/427; 280/267

[56] References Cited

U.S. PATENT DOCUMENTS

| | | |
|---|---|---|
| 4,581,952 | 4/1986 | Yabe . |
| 4,593,578 | 6/1986 | Kobayashi et al. . |
| 4,691,583 | 9/1987 | Taig . |
| 4,785,685 | 11/1988 | Kobayashi et al. . |
| 4,800,770 | 1/1989 | Kobayashi et al. . |
| 4,936,157 | 6/1990 | Kotake et al. ......................... 74/498 X |
| 4,939,947 | 7/1990 | Toyoshima et al. ..................... 74/422 |
| 4,996,905 | 3/1991 | Borror ................................. 74/388 PS |
| 5,022,279 | 6/1991 | Ueno et al. . |
| 5,265,691 | 11/1993 | Konishi et al. ........................ 74/422 X |

*Primary Examiner*—David M. Fenstermacher
*Attorney, Agent, or Firm*—Tarolli, Sundheim, Covell, Tummino & Szabo L.L.P.

[57] ABSTRACT

A rack guide (30) in a rack and pinion steering gear housing (12) comprises a cylindrical structure having a peripheral wall (42), an end wall (52), and an inner wall (71). The peripheral wall (42) has an outer surface (40) with a contour complementary to an inner surface (44) of the housing (12). The end wall (52) has a rack guide surface (54) configured to engage the rack (14) in line contact along a first straight line (57) parallel to the longitudinal axis (17) of the rack (14). The inner wall (71) has a linear configuration adjoining the end wall (52) along a second straight line (101) parallel to the first straight line (57).

9 Claims, 2 Drawing Sheets

6,076,417

RACK GUIDE HAVING LINEAR INNER WALLS FOR SUPPORTING A RACK

RELATED APPLICATION

This application is a continuation-in-part of U.S. patent application Ser. No. 08/804,989, filed Feb. 25, 1997, entitled "Rack Guide" now abandoned.

FIELD OF THE INVENTION

The present invention relates to a rack and pinion steering gear, and particularly relates to a rack guide for supporting a rack in engagement with a pinion in a rack and pinion steering gear.

BACKGROUND OF THE INVENTION

A rack and pinion steering gear has a housing containing a rack and pinion. The rack has a longitudinally extending row of rack teeth in meshing engagement with helical gear teeth on the pinion. The opposite ends of the rack project outward from the housing, and are connected with a steering linkage and a corresponding pair of steerable vehicle wheels. The pinion is connected with the vehicle steering wheel by an input shaft and a torsion bar. When a steering maneuver is being performed, the pinion rotates, and the rack moves longitudinally. The housing also contains a spring-loaded rack guide which presses the rack against the pinion to maintain the rack teeth in meshing engagement with the gear teeth on the pinion.

SUMMARY OF THE INVENTION

The present invention is a rack guide for a steering rack in a rack and pinion steering gear housing. In accordance with the present invention, the rack guide is a cylindrical structure with a peripheral wall, an end wall, and an inner wall. The peripheral wall has an outer surface with a contour complementary to an inner surface of the housing. The end wall has a guide surface configured to engage the rack in line contact along a first straight line parallel to the longitudinal axis of the rack. The inner wall has a linear configuration adjoining the end wall along a second straight line parallel to the first straight line.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF PREFERRED EMBODIMENTS

Figure 1:
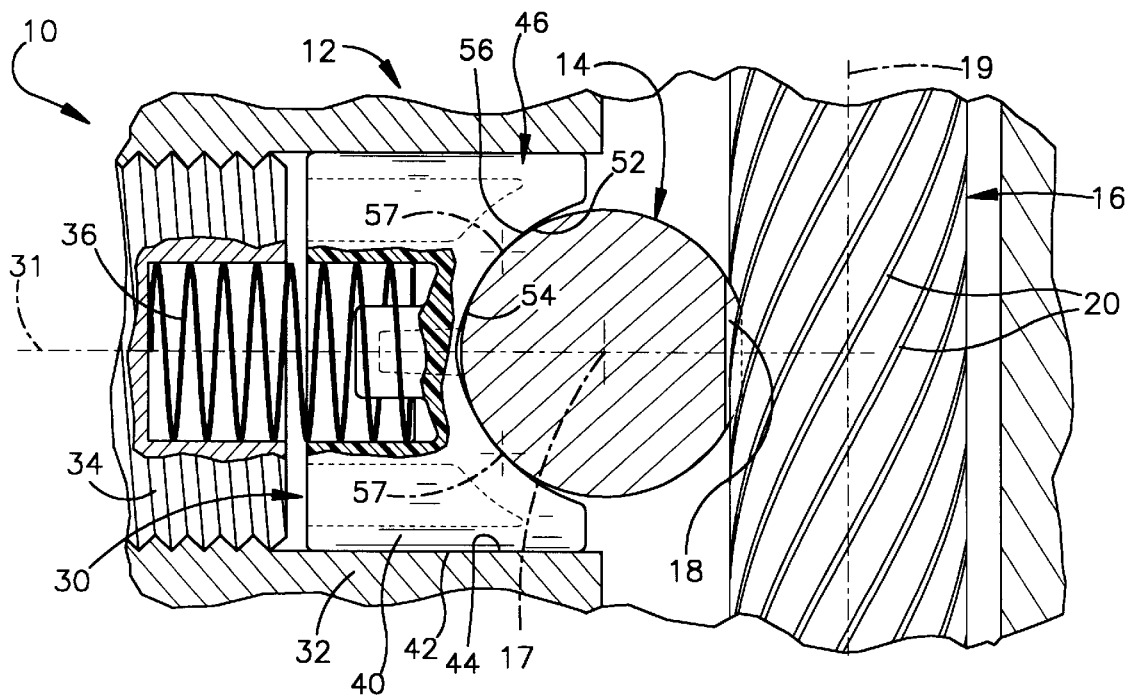
FIG. 1 is a partial view of an apparatus including a rack guide comprising a first embodiment of the present invention.
Figure 2:
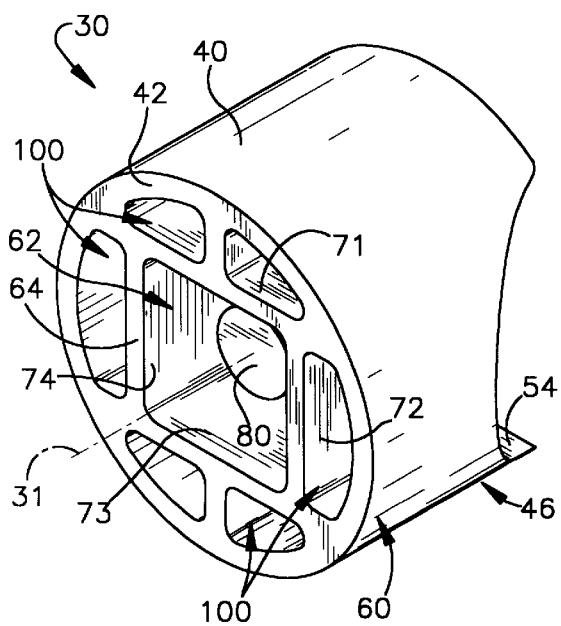
FIGS. 2 and 3 are perspective views of the rack guide of FIG. 1.

An apparatus 10 comprising a first embodiment of the present invention is shown partially in FIG. 1. The apparatus 10 is a rack and pinion steering gear including a housing 12 containing a rack 14 and a pinion 16. The rack 14 has a longitudinal central axis 17 and an axially extending row of rack teeth 18. The pinion 16 has an axis of rotation 19, and has helical gear teeth 20 meshing with the rack teeth 18. As known in the art, the opposite ends of the rack 14 are connected with a steering linkage and a corresponding pair of steerable vehicle wheels. The pinion 16 is connected with the vehicle steering wheel by an input shaft and a torsion bar. When a steering maneuver is being performed, the pinion 16 rotates about the axis 19, and the rack 14 moves longitudinally along the axis 17.

The steering gear 10 further includes a rack guide 30. The rack guide 30, which may be referred to as a yoke, has a cylindrical shape centered on an axis 31 perpendicular to the rack axis 17. As shown in FIG. 1, the rack guide 30 is contained in a cylindrical section 32 of the housing 12 between a closure cap 34 and the rack 14. A spring 36 is compressed between the rack guide 30 and the closure cap 34.

The spring 36 applies an axially directed preloading force which urges the rack guide 30 forcefully against the rack 14 in a direction from left to right, as viewed in FIG. 1. The rack guide 30, in turn, applies the preloading force to the rack 14 so as to hold the rack teeth 18 firmly in meshing engagement with the gear teeth 20 on the pinion 16 without rattling. Moreover, the rack 14 transmits dynamic loads from the vehicle steering linkage to the rack guide 30. The spring 36 is compressible under such loads, and is thus compressible sufficiently for the rack guide 30 to move from right to left, as viewed in FIG. 1, into abutment with the closure cap 34. Such loads are then transmitted through the rack guide 30 from the rack 14 to the closure cap 34, and further from the closure cap 34 to the housing 12.

As shown in greater detail in FIGS. 2–5, the rack guide 30 has a cylindrical outer surface 40 centered on the axis 31. The outer surface 40 is defined by a cylindrical peripheral wall 42 of the rack guide 30. As indicated in FIG. 1, the outer surface 40 has a contour which is complementary to an inner surface 44 of the cylindrical housing section 32.

Figure 3:
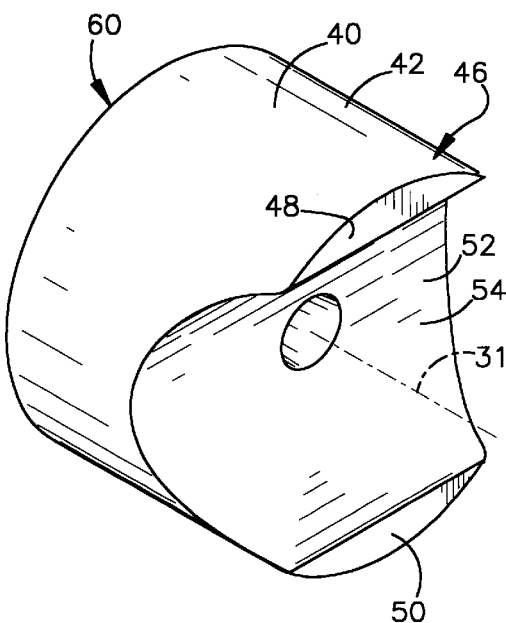

As best shown in FIG. 3, a first end portion 46 of the rack guide 30 includes a pair of diametrically opposed end segments 48 and 50 of the peripheral wall 42. The first end portion 46 of the rack guide 30 further includes a concave end wall 52 with a guide surface 54 extending across the axis 31. The guide surface 54 has an arcuate contour which is complementary to a cylindrical surface portion 56 (FIG. 1) of the rack 14 opposite the rack teeth 18.

When the rack 14 moves longitudinally along the axis 17 (FIG. 1), it slides against the guide surface 54. Specifically, the guide surface 54 contacts the cylindrical surface portion 56 of the rack 14 along two contact lines 57. The contact lines 57 are parallel to the axis 17 of the rack 14, and are equally spaced from the axis 31 of the rack guide 30 on opposite sides of the axis 31. The line contact, as opposed to a greater surface area contact, helps to minimize friction between the rack 14 and the rack guide 30. The evenly spaced-apart locations of the contact lines 57 help to ensure that the loads transmitted through the rack 14 from the steering linkage to the rack guide 30 are applied to the rack guide 30 equally on opposite sides of the axis 31, and also help to ensure that the preloading force of the spring 36 is distributed evenly on opposite sides of the axis 31 at the locations where the rack teeth 18 engage the gear teeth 20.

Figure 4:
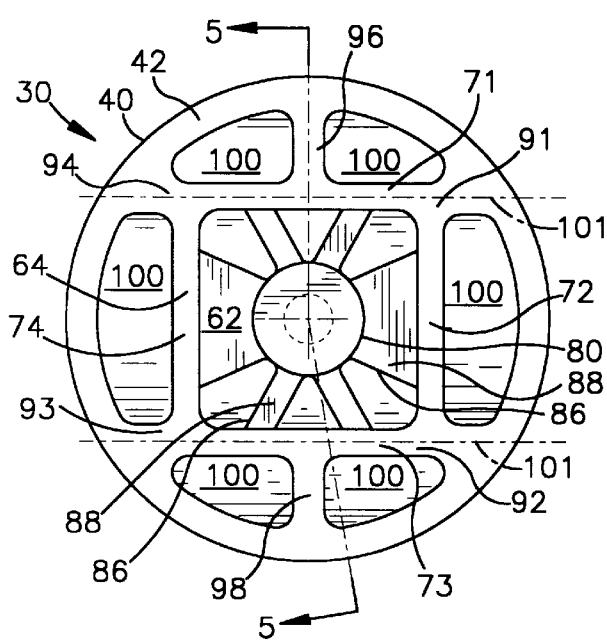
FIG. 4 is an end view of the rack guide of FIG. 1.

A second, opposite end portion 60 of the rack guide 30 defines a compartment 62 for receiving the spring 36. The spring compartment 62 also is centered on the axis 31, and has a rectangular peripheral shape defined by a rectangular inner wall structure 64 of the rack guide 30. The rectangular inner wall structure 64 is preferably square, as best shown in FIG. 4, and thus includes four orthogonal inner walls 71, 72, 73, and 74 with equal lengths extending around the axis 31.

A cylindrical stub shaft portion 80 (FIG. 5) of the rack guide 30 extends partially along the axis 31 from the concave end wall 52 toward the open end of the spring compartment 62. The stub shaft 80 helps to center the spring 36 in the spring compartment 64, and is preferably hollow for weight reduction. A plurality of ribs 86 project radially from the stub shaft 80 to the four surrounding inner walls 71–74. The ribs 86 have coplanar spring-abutment surfaces 88 facing axially outward through the spring compartment 62.

The rectangular inner wall structure 64 is joined with the cylindrical peripheral wall 42 at a plurality of locations. These include the four corners of the rectangular inner wall structure 64. More specifically, four corner junctures 91, 92, 93, and 94 extend radially outward from the four corners of the rectangular inner wall structure 64 to the cylindrical peripheral wall 42. A pair of stiffener walls 96 and 98 extend radially outward from the first and second inner walls 71 and 73 to the cylindrical peripheral wall 42. The stiffener walls 96 and 98 are perpendicular to the first and second inner walls 71 and 73 and intersect the cylindrical peripheral wall 42 at diametrically opposed locations. In this configuration, the rack guide 30 has a plurality of weight-reduction cavities 100. The weight reduction cavities 100 are located radially between the rectangular inner wall structure 64 and the cylindrical peripheral wall 42, and are located circumferentially between adjacent pairs of the corner junctures 91–94 and the stiffener walls 96 and 98. Like the spring compartment 62, the weight-reduction cavities 100 have depths extending axially from their open ends to the concave end wall 52 at the opposite end portion 46 of the rack guide 30.

The rack guide 30 in the preferred embodiment of the present invention is a unitary part consisting of a continuous body of molded plastic material. The plastic material, including any reinforcing filler materials, may have any suitable composition known in the art. For example, a particularly suitable plastic material is a glass-filled polyester such as Rynite 545 or similar material with optional modifiers such as Teflon. In any case, the rectangular inner wall structure 64, the corner junctures 91–94 and the stiffener walls 96 and 98 provide the rack guide 30 with axial stiffness sufficient to transmit loads between the rack 14, the spring 36 and the closure cap 36 in the manner described above with a minimum amount of deflection. Importantly, those structural features and the weight-reduction cavities 100 together provide high structural rigidity with a low amount of material, i.e., a high performance to weight ratio. The use of less material enables faster molding cycle times with less shrinkage.

Figure 5:
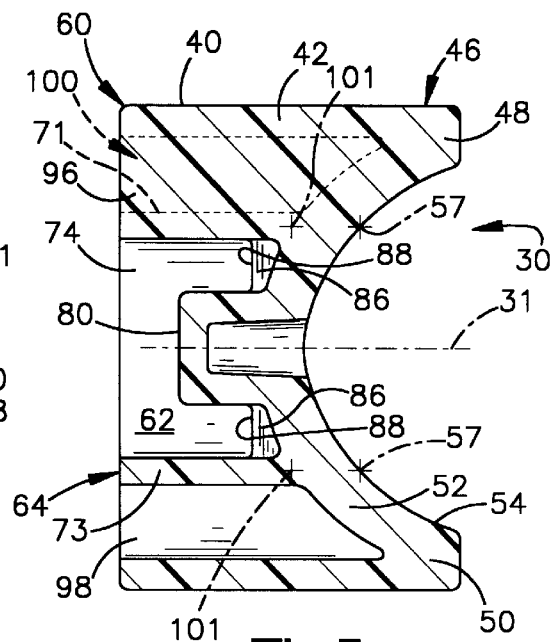
FIG. 5 is a sectional view taken on line 5—5 of FIG. 4.

A particular feature of the present invention relates to the relationship of the rectangular inner wall structure 64 with the end wall 52. As shown in FIGS. 4 and 5, the first and second inner walls 71 and 73 adjoin the end wall 52 along a pair of lines 101. The lines 101 are parallel to the contact lines 57 (FIG. 5) along which the rack 14 contacts the rack guide 30 at the end wall 52, and are evenly spaced from the axis 31 equally with the contact lines 57. The first and second inner walls 71 and 73 are thus located adjacent to the contact lines 57 at the end wall 52. This provides backing support directly to the linear portions of the end wall 52 at which the loads are applied along the contact lines 57. As further shown in FIG. 4, the four corner junctures 91–94 provide continued backing support to the end wall 52 as they project along the lines 101 from the first and second inner walls 71 and 73 to the peripheral wall 42.

Figure 6:
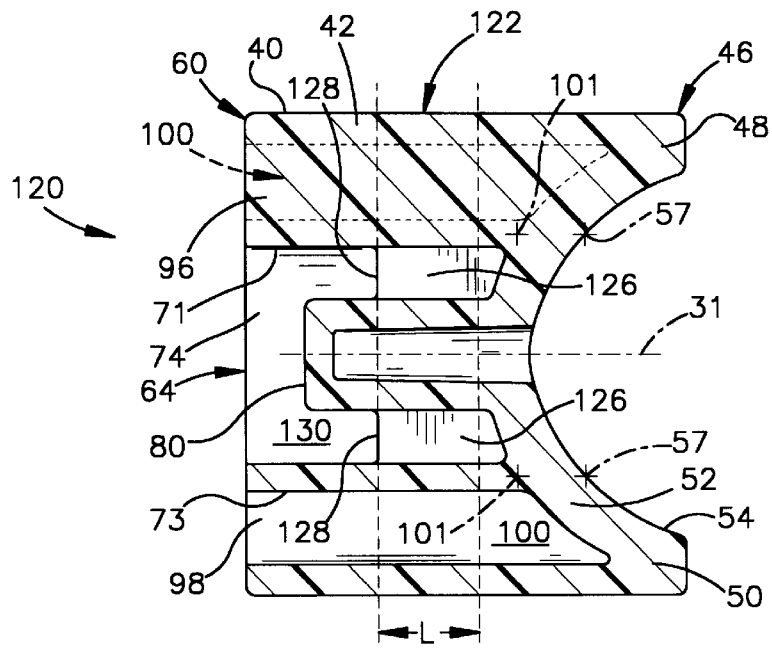
FIG. 6 is a view similar to FIG. 5 showing a rack guide comprising a second embodiment of the present invention.

FIG. 6 is a sectional view similar to FIG. 5 showing an alternative rack guide 120 comprising a second embodiment of the present invention. The rack guide 120 has parts that are substantially similar to corresponding parts of the rack guide 30 described above. This is indicated by the use of the same reference numbers for such parts of the two different rack guides 120 and 30. The rack guide 120 differs from the rack guide 30 in that the rack guide 120 is substantially longer than the rack guide 30. The rack guide 120 is thus constructed for use in a steering gear housing with a cylindrical section that likewise differs from the cylindrical section 32 of the housing 12.

In accordance with the present invention, the increased length of the rack guide 120 is provided by a longitudinally extending section 122 having a length L, as shown in FIG. 6. The rack guide 120 thus has ribs 126 which are axially larger than the ribs 86 (FIG. 5) in the rack guide 30. However, the distance from the spring-abutment surfaces 128 to the open end of the spring compartment 130 is the same as the corresponding distance in the rack guide 30. This enables the rack guide 120 to be used with a spring the same size as the spring 36. Additionally, the various connector portions and wall portions of the rack guide 120 that are located radially outward of the ribs 126 are equally longer than their counterparts in the rack guide 30. The depths of the spring compartment 62 and the weight-reduction cavities 100 in the rack guide 120 are likewise greater. Accordingly, the length of a rack guide constructed in accordance with the present invention can be increased without substantially changing the performance to weight-ratio of the rack guide.

From the above description of the invention, those skilled in the art will perceive improvements, changes and modifications. Such improvements, changes and modifications within the skill of the art are intended to be covered by the appended claims.

Having described the invention, the following is claimed:

1. A rack guide for a steering rack in a rack and pinion steering gear housing, said rack guide comprising:

a cylindrical structure having a peripheral wall, an end wall, and an inner wall;

said peripheral wall having an outer surface with a contour complementary to an inner surface of the housing;

said end wall having a guide surface configured to engage the rack in line contact along a first straight line parallel to the longitudinal axis of the rack;

said inner wall having a linear configuration adjoining said end wall along a second straight line aligned with and parallel to said first straight line.

2. Apparatus as defined in claim 1 wherein said first and second straight lines are equally spaced from a central axis of said cylindrical structure.

3. A rack guide as defined in claim 1 wherein said guide surface is configured to engage the rack in line contact along a pair of first straight lines parallel to the longitudinal axis of the rack, said first straight lines being located on opposite sides of a central axis of said cylindrical structure, said inner wall being one of a pair of linear inner walls which adjoin said end wall along a corresponding pair of second straight lines parallel and adjacent to said first straight lines.

4. Apparatus as defined in claim 3 wherein said first straight lines are equally spaced from said central axis, said second straight lines being spaced from said central axis equally with said first straight lines.

5. Apparatus as defined in claim 4 wherein said cylindrical structure is a unitary part consisting of a continuous body of molded plastic material.

6. Apparatus as defined in claim 1 wherein said pair of linear inner walls are a portion of an inner wall structure having a rectangular contour defining a rectangular compartment for receiving a spring.

7. Apparatus as defined in claim 6 wherein said pair of linear inner walls comprise two of four orthogonal wall portions of said rectangular inner wall structure.

8. A rack guide (30) for a steering rack in a rack and pinion steering gear housing, said rack guide comprising:

a cylindrical structure made of a unitary part consisting of a continuous body of molded plastic material and having a peripheral wall (42), an end wall (52) and an inner wall structure (64);

said peripheral wall having an outer surface with a contour complementary to an inner surface (44) of the housing;

said end wall having a guide surface (54) configured to engage the rack so that the rack slides along the longitudinal axis (17) of the rack;

said inner wall structure being of a rectangular configuration having a first pair of linear inner walls (71,73) adjoining said end wall on opposite sides of said longitudinal axis of the rack, said first pair of inner walls extending parallel to said longitudinal axis of the rack, said inner wall structure having a second pair of inner walls (72, 74) extending normal to said first pair of inner walls (71,73);

said first pair of inner walls (71,73) being spaced equally from a central axis (31) of said cylindrical structure; and a pair of stiffener walls (96,98) extending normally from said first pair of inner walls (71,73) at diametrically opposed locations to said peripheral wall (42).

9. An apparatus according to claim 8 wherein said inner walls (71,72,73,74) form a rectangular compartment (62) for receiving a spring (36).

* * * * *